US012634716B2

(12) United States Patent
Singhal

(10) Patent No.: US 12,634,716 B2
(45) Date of Patent: May 19, 2026

(54) CU-CP HIGH AVAILABILITY

(71) Applicant: Parallel Wireless, Inc., Nashua, NH (US)

(72) Inventor: Mukesh Singhal, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 474 days.

(21) Appl. No.: 18/068,520

(22) Filed: Dec. 19, 2022

(65) Prior Publication Data

US 2023/0199524 A1 Jun. 22, 2023

Related U.S. Application Data

(60) Provisional application No. 63/290,913, filed on Dec. 17, 2021.

(51) Int. Cl.
*H04W 24/02* (2009.01)

(52) U.S. Cl.
CPC ................................. *H04W 24/02* (2013.01)

(58) Field of Classification Search
None
See application file for complete search history.

(56) References Cited

U.S. PATENT DOCUMENTS

2016/0127169 A1    5/2016  Rosa de Sousa Teixeira et al.
2018/0376338 A1   12/2018  Ashrafi 2019/0141095 A1*   5/2019  John ................... G06F 9/45558
2020/0042365 A1    2/2020  Tanna et al.
2020/0260427 A1    8/2020  Schefczik et al.
2021/0185601 A1*   6/2021  Altay ..................... H04W 28/24
2021/0243613 A1*   8/2021  Khanfouci .......... H04L 41/0895
2021/0243770 A1*   8/2021  Roessler ............. H04W 72/543
2022/0183089 A1*   6/2022  Walldeen .............. H04W 76/12
2022/0400424 A1   12/2022  Ghadge et al.
2023/0007486 A1*   1/2023  Ni ......................... H04L 63/164
2023/0055306 A1    2/2023  Ghadge
2023/0370872 A1   11/2023  Singhal et al.
2024/0137108 A1*   4/2024  Li ....................... H04W 88/085
2024/0365432 A1*  10/2024  Tamura ................. H04W 76/19

OTHER PUBLICATIONS

Jack Jia, "Building Unified PaaS Architecture for Agile Development," Apr. 7, 2017, Huawei Technologies Co., Ltd.
"Enterprise Service Bus," Wikipedia, the free encyclopedia, Retrieved Jul. 30, 2018.
"Jorg Niemoller, Ioannis Fikouras, Frans De Rooij, Lucas Klostermann, Ulf Stringer, Ulf Olsson," Ericsson Composition Engine—Next-generation IN, Jan. 2009, Ericsson Review (English Edition).

(Continued)

*Primary Examiner* — Faruk Hamza
*Assistant Examiner* — Cassandra L Decker
(74) *Attorney, Agent, or Firm* — Michael Y. Saji

(57) ABSTRACT

A method of providing CU-CP high availability is disclosed, comprising: configuring a single CU-CP instance across a first node and a second node, The single CU-CP instance appears as a single node having multiple IPs to all its peer nodes; keeping session information of the single CU-CP instance at the first node and at the second node; and wherein if the first node fails, the second node may be configured to take up calls from the first node.

6 Claims, 10 Drawing Sheets

400

(56) References Cited

OTHER PUBLICATIONS

Falko Menge, "Enterprise Service Bus," Free and Open Source Software Conference 2007.

"Etisalat Transforms BBS With Ericsson," Dec. 18, 2013, Light Reading, an Informa business, trading within KNect365 US, Inc.

Jeffery Vogel, Michael Stricklen, "How Loosely Coupled Architectures are Helping the Modernization of Legacy Software," Oct. 2, 2017, EYGM Limited (Formerly Bulger Partners).

"Loose Coupling," Wikipedia, the free encyclopedia, Retrieved Jul. 30, 2018.

Jurgen Kress, Berthold Maier, Hajo Normann, Danilo Schmeidel, Guido Schmutz, Bernd Trops, Clemens Utschig-Utschig, Torsten Winterberg, "Enterprise Service Bus," Jul. 2013, Oracle Technical Resources (Formerly Oracle Technology Network).

Richard Watson, "How to Architect and Design Cloud-Native Applications," Dec. 29, 2015, Gartner Research, ID G00296114, retrieved from https://www.gartner.com/en/documents/3181919.

"ICT Platform for Digital Communication Providers," Sep. 2, 2015, Ericsson and TIBCO Software, Inc.

"5G; NG-RAN; E1 Application Protocol (E1AP)" (3GPP TS 38.463 version 16.2.0 Release 16), Jul. 2020.

"5G; NG-RAN; Architecture description", (3GPP TS 38.401 version 15.2.0 Release 15), Jul. 2018.

Gallenmüller et al.: "Comparison of Frameworks for High-Performance Packet IO", 2015 IEEE.

"5G NR Interfaces X2/Xn, S1/NG, F1 and E1 Functions", https://www.techplayon.com/5g-nr-interfaces-x2-xn-s1-ng-f1-and-e1-functions/, May 24, 2019.

"5G NR gNodeB Functional Split : CU DU split", https://www.5g-networks.net/5g-technology/gnodeb-gnb-cu-du-split/, Mar. 31, 2020.

* cited by examiner

CU-CP HIGH AVAILABILITY

CROSS-REFERENCE TO RELATED APPLICATIONS

The present application claims priority under 35 USC § 119(e) to U.S. Prov. App. No. 63/290,913, titled "CU-UP High Availability," and filed Dec. 17, 2021, hereby incorporated by reference in its entirety. In addition, the present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes, respectively. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03). This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

The 3GPP 5G RAN architecture and known as NG-RAN, introduces new interfaces and functional modules. The NG-RAN consists of a set of radio base stations i.e. gNBs which is connected to 5GC (5G core network). The gNB has three main functional modules: the Centralized Unit (CU), the Distributed Unit (DU) and the Radio Unit (RU). The gNB-CU is further disaggregated into CU control plane (CU-CP) and CU data plane (CU-UP).

SUMMARY

A method of providing CU-CP high availability is disclosed, comprising: configuring a single CU-CP instance across a first node and a second node, The single CU-CP instance appears as a single node having multiple IPs to all its peer nodes; keeping session information of the single CU-CP instance at the first node and at the second node; and wherein if the first node fails, the second node may be configured to take up calls from the first node.

The method may further comprise configuring the single CU-CP instance using core microservices and protocol-specific microservices. The method may further comprise maintaining subscriber data for a plurality of subscribers in a database, The plurality of subscribers may include at least one subscriber supported at the first node and at least one subscriber supported at the second node. The method may further comprise configuring the single CU-CP instance across a cluster of virtualized machines providing redundancy and failover.

Upon failure of the first node, microservices at the second node may be informed of the failure of the first node. Upon failure of a microservice at the first node, microservices at the first node may be informed of the failure of the microservice at the first node.

DETAILED DESCRIPTION

Figure 1:
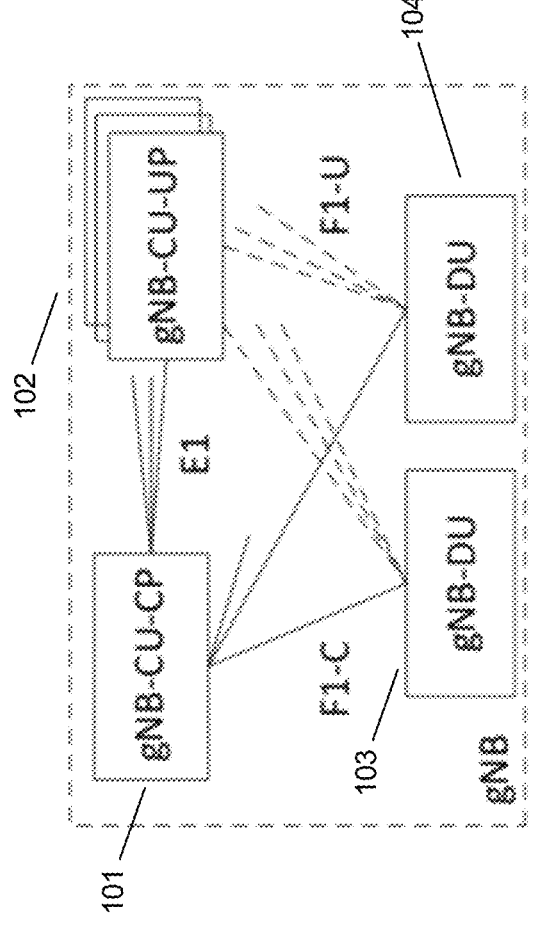
FIG. 1 shows a schematic diagram of a 5G gNodeB, in accordance with some embodiments.

In some embodiments, it is considered to configure single CU-CP instance on two cluster/nodes in public/private could with the help of SMO (Service management and orchestration). CU-CP will appear as single node having multiple IPs to all its peer node like DU/CU-UP/AMF/4g-CU/5g-CU etc. Each CU-CP instance keeps session information and other relevant information in database cluster. Database cluster will also have 1:1 replication/redundancy.

In case any one of the clusters fails, another cluster is ready to take up the calls from peer node (in some embodiments any other cluster). There will be no or little downtime at all, as database have all the required information to serve any subscriber. During normal course of time, both the cluster will operate at less than 50% capacity and enough resource will be provisioned in advance. This will help in taking over the load of failed cluster.

With this model, there will be no single point of failure in CU-CP. This will solve the problem of one of the clusters/nodes down, link failure, any micro service failure or power failure, natural calamity etc. This solution provides geographical redundancy as well.

The CU-CP (central unit control plane) handles RRC and the control plane part of the PDCP protocol. This node communicates with DU over F1-C interface and with CU-UP over E1 interface as defined in 3GPP specifications.

CU-UP/s: This node handles user plane part of PDCP protocol and SDAP protocol. It communicates with CU-CP over E1 interface and with DU over F1-U interface.

SMO (Service management and orchestration):

Control of infra structure component like CPU/Memory and scale up and scale down operations FCAPS (Fault, Configuration, Security, Performance, Accounting) management of Open-RAN elements (gNB-CU-CP, gNB-CU-UP, gNB-DU).

The access and mobility management function (AMF) and session management function (SMF) (AMF/SMF) are the 3GPP defined 5G core network elements for control signaling, such as connection management and mobility management.

The user plane function (UPF) is the 3GPP defined 5G core network element for data-plane traffic.

The distributed unit (DU) (gNB-DU) is the 3GPP defined 5G access network element.

The F1-Micro-service is the micro-service in CU-CP cluster to handle F1-APP interface signaling with gNB-DU. F1-APP interface terminates at F1-Micro-service for outside world. F1-Micro-service exposes at least 1 public IP to gNB-DU to communicate.

The database may be an in memory key-value pair database. All micro-services in CU-CP deployment will share common database to synchronize information across pods or micro-service. DB act as central entity in deployment. The DB has its own distribution model.

As defined in 3GPP specification, gNB-CU-CP has interfaces to DU/AMF/CU-UP/4g-CU/5g-CU/RT-RIC etc. In case any interface connection goes down, site experience power failure, fiber cut or any micro-service within gNB-CU-CP crashes. Idea is to provide service continuity in all such cases.

3GPP specification has provided on all interfaces provision to use multiple IP connections (Max 32 TNL association per interface) on each interface.

Logical Architecture

FIG. 1 shows a schematic diagram 100 of a 5G gNodeB, in accordance with some embodiments. gNB-DU 103, 104 are in communication with a gNB-CU-CP control plane node 101 and a gNB-CU-UP user plane node 102. gNB-CU-UP may be a plurality of nodes that provide data service to gNB-DUs as needed, including a gateway to other networks. gNB-CU-CP and gNB-CU-UP may be in communication over an E1 protocol as needed to coordinate authentication, mobility, etc. for the gNBs 103, 104.

Figure 2:
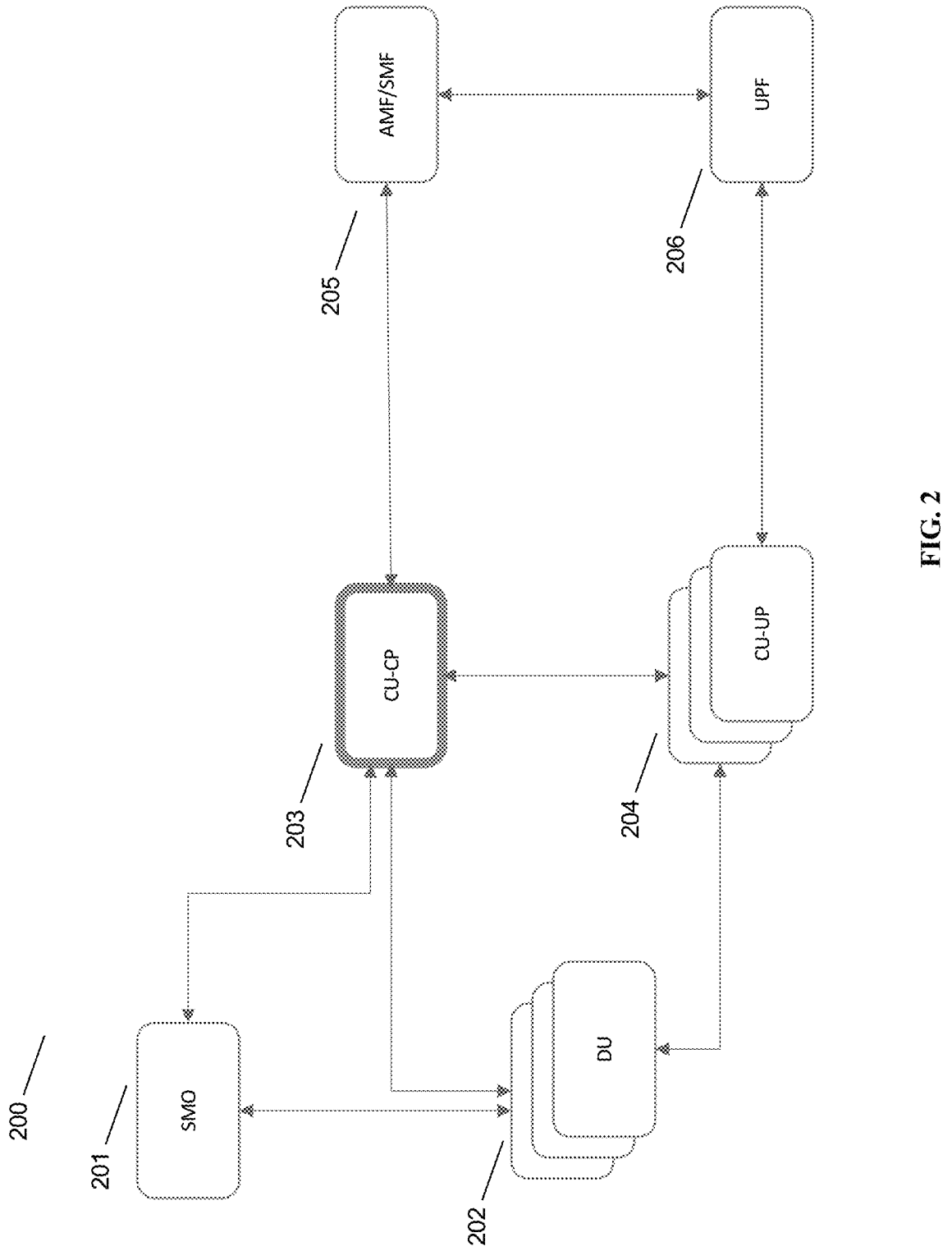
FIG. 2 shows a schematic diagram of a CU-CP Open RAN architecture, in accordance with some embodiments.

FIG. 2 shows a schematic diagram 200 of a CU-CP Open RAN architecture, in accordance with a 5G architecture. CU-CP 203 is in communication with a plurality of DUs 202, with one or more CU-UPs 204, service management and orchestration node (SMO) 201, and AMF/SMF 205. UPF 206 is also in communication with AMF/SMF and CU-UP.

Figure 3:
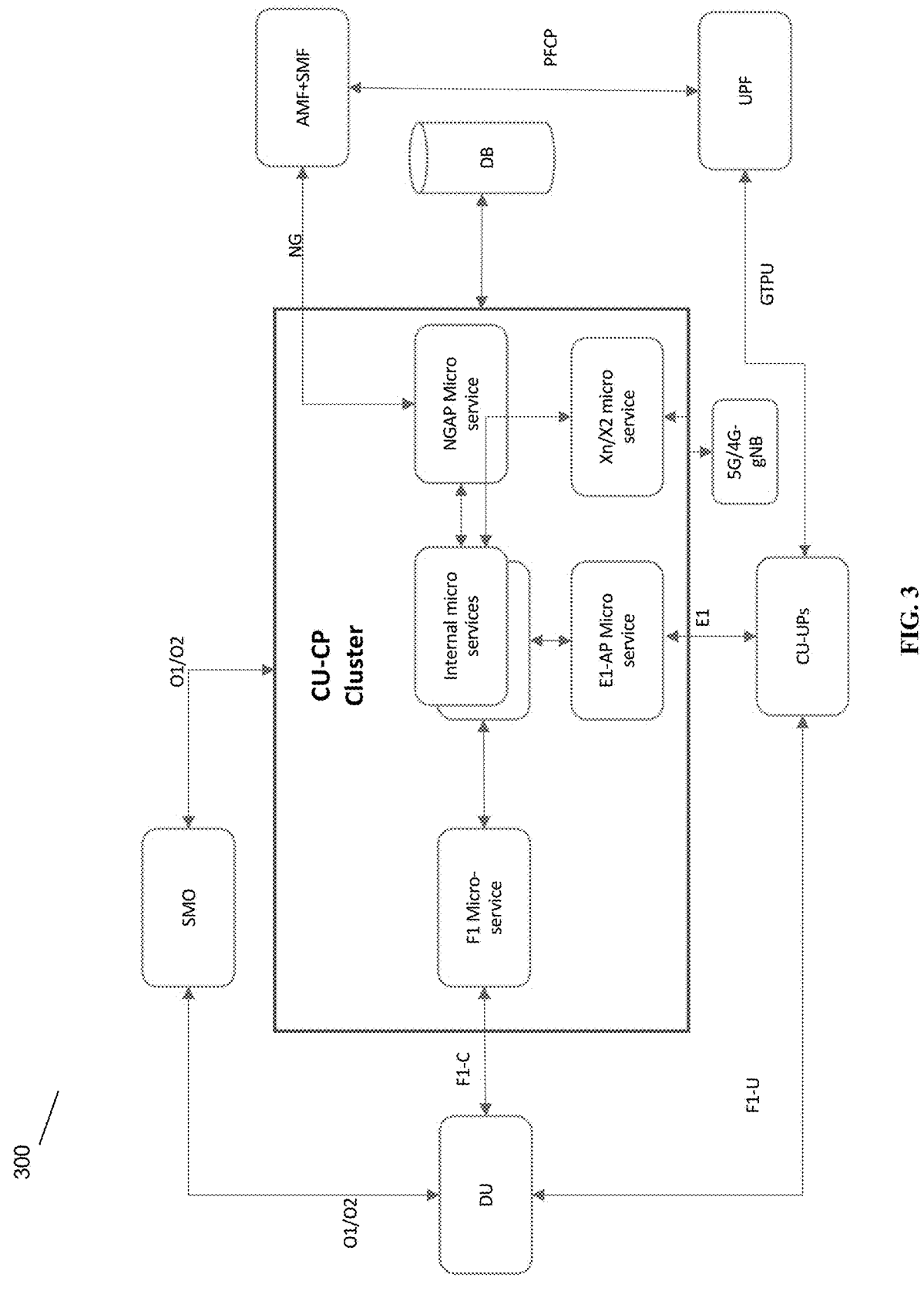
FIG. 3 shows a schematic diagram of a CU-CP internal logical architecture, in accordance with some embodiments.

FIG. 3 shows a schematic diagram 300 of a CU-CP internal logical architecture, in accordance with some embodiments. Greater detail is shown regarding the CU-CP, which is in communication with the various nodes listed in FIG. 2. CU-CP is implemented as a cluster, in accordance with some embodiments. CU-CP communicates over an O1/O2 interface with SMO, an F1-C interface with DU, an E1 interface with one or more CU-UPs, an NG interface with AMF/SMF, and other 5G interfaces as known in the 3GPP specification. Internally, one or more microservices are used to handle each of F1, E1-AP, Xn/X2, NGAP, etc, as well as other internal microservices. Microservices are well known in the art and are configurable to have one or more characteristics such as: scalability, reliability, failover, redundancy, replication, etc. Techniques known for microservices are used to enable the CU-CP to have increased reliability and reduced cost to operate. A database is used for data storage for the CU-CP, in some embodiments.

Figure 4:
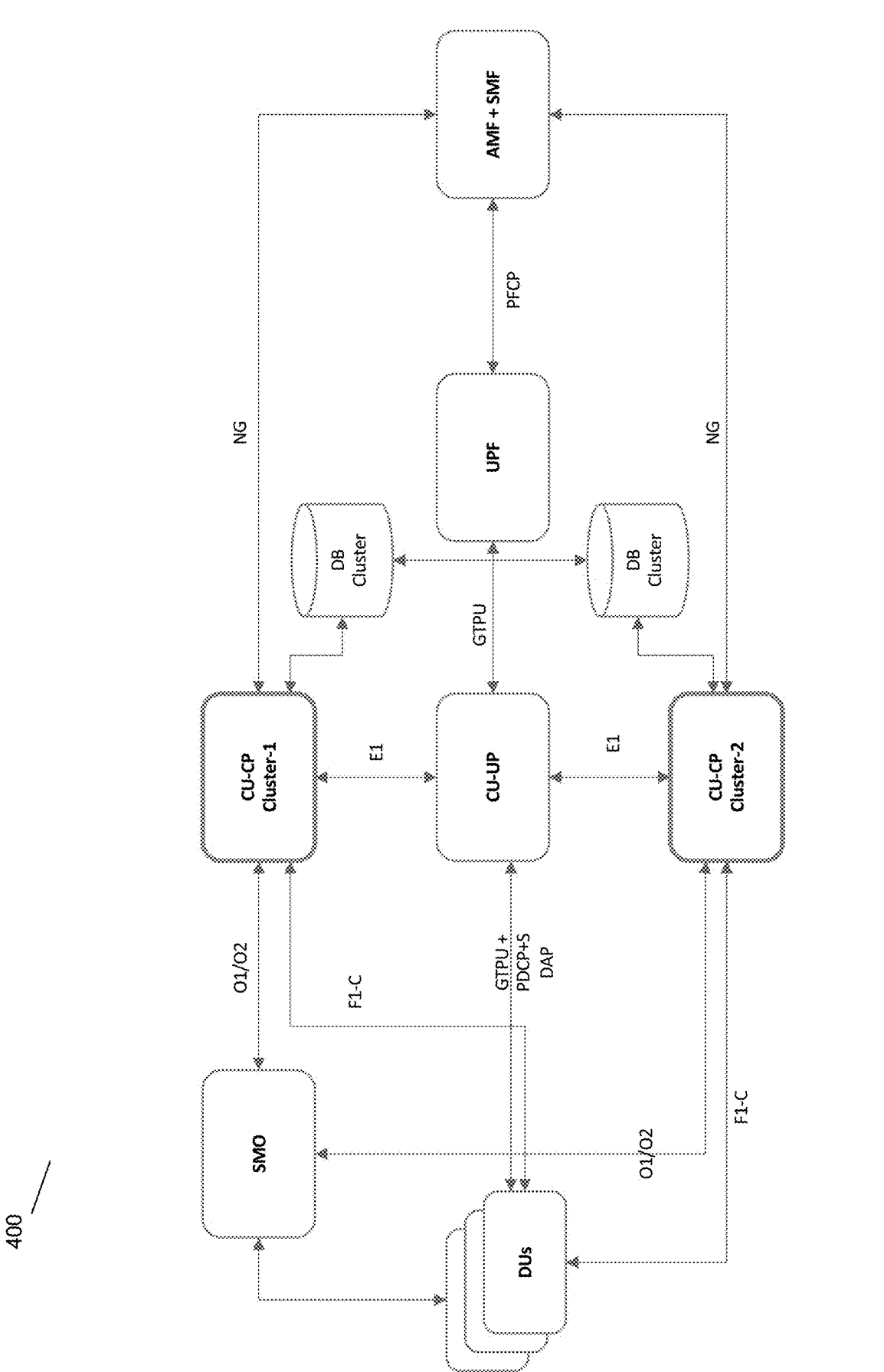
FIG. 4 shows a schematic diagram of a CU-CP high availability architecture, in accordance with some embodiments.

FIG. 4 shows a schematic diagram 400 of a CU-CP high availability architecture, in accordance with some embodiments. CU-UP is in communication with two CU-CP clusters, cluster 1 and cluster 2. Each CU-CP cluster is in communication with its own database cluster. The database clusters may have failover and reliability capabilities, as known in the art, and may use each other as failover spares, and may be in communication and/or may sync with each other, in some embodiments. The design and separation between CU-CP Cluster 1 and CU-CP Cluster 2 is described in the following paragraphs and is designed to enable the functionality described below. The multi-layered failover and redundancy architecture of this architecture, including failover hot spares, containerization, microservices within each cluster providing individual sub-services, clustering and multiple instances with data sharding, and data replication enables high availability for the CU-CP.

Failure Scenarios

The following failure scenarios have been considered and are described below in relation to the present disclosure in various embodiments: CU-CP on one of cluster goes down; F1 interface of one of the CU-CP cluster goes down; E1 interface of one of the CU-CP cluster goes down; NGAP interface of one of the CU-CP cluster goes down; Xn-App/X2 interface of one of the CU-CP cluster goes down; and one of the Database instances/clusters goes down.

Scenario 1: One CU-CP Cluster Goes Down (FIG. 5)

Figure 5:
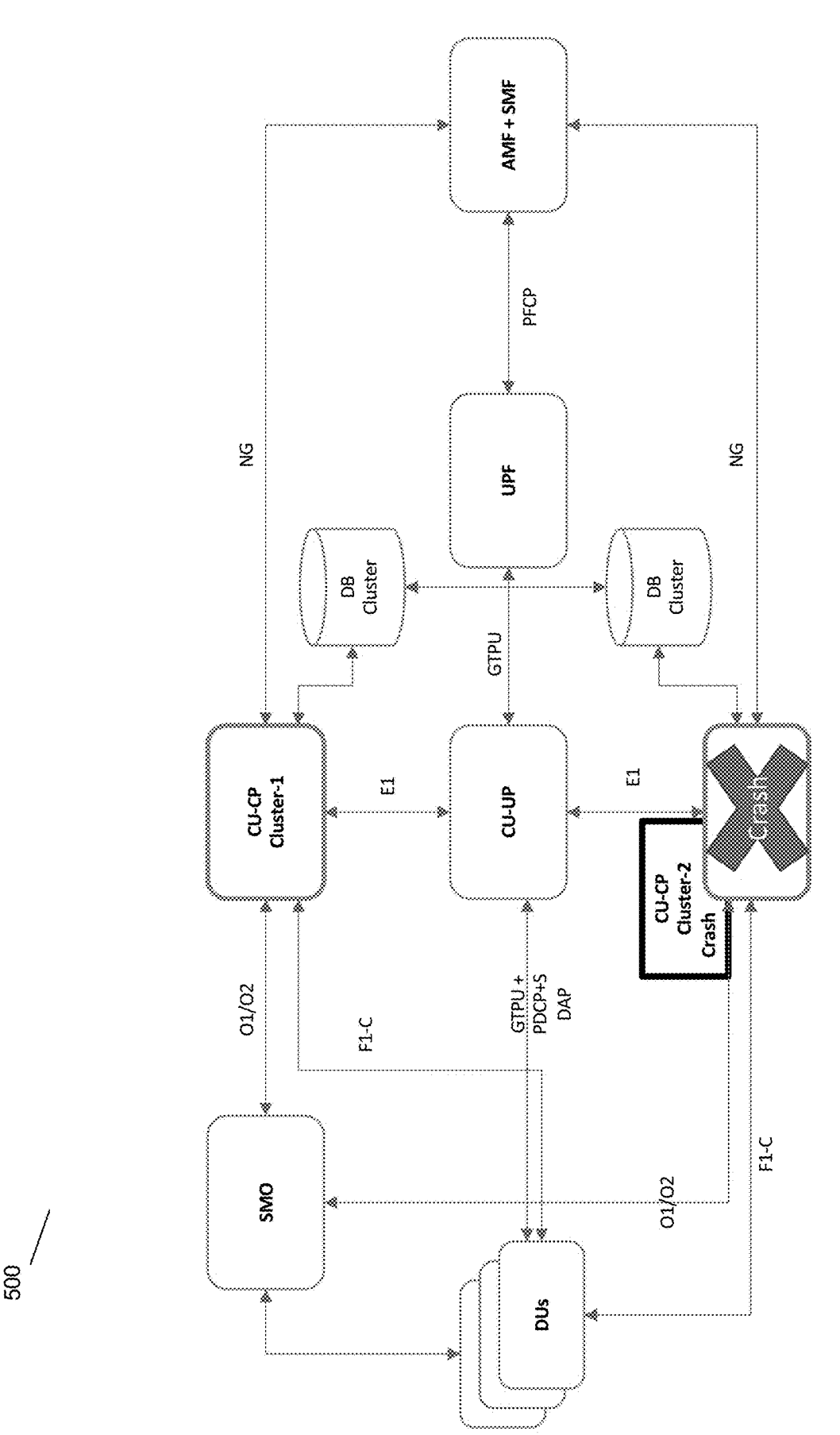
FIG. 5 shows a schematic diagram of a CU-CP high availability architecture in a first scenario, in accordance with some embodiments.

FIG. 5 shows a schematic diagram of a CU-CP high availability architecture in a first scenario, in accordance with some embodiments. In case one of the clusters goes down completely, other CU-CP cluster is available to serve all the subscribers. All the peer nodes may identify failure condition and may route the calls to another IP. For all peer nodes, internal topology of CU-CP is split into 2 cluster is not known and not important as long as services are provided by CU-CP.

Database will have all the state and non-state information for serving the calls. Any new calls or existing call will be served accordingly by available CU-CP instance.

SMO will try to bring up the new cluster/node of CU-CP instance. CU-CP instance is up and start connecting with peer nodes then peer nodes will start using new CU-CP instance.

Scenario 2: F1 Interface/Link Down on One CU-CP Cluster (FIG. 6)

Figure 6:
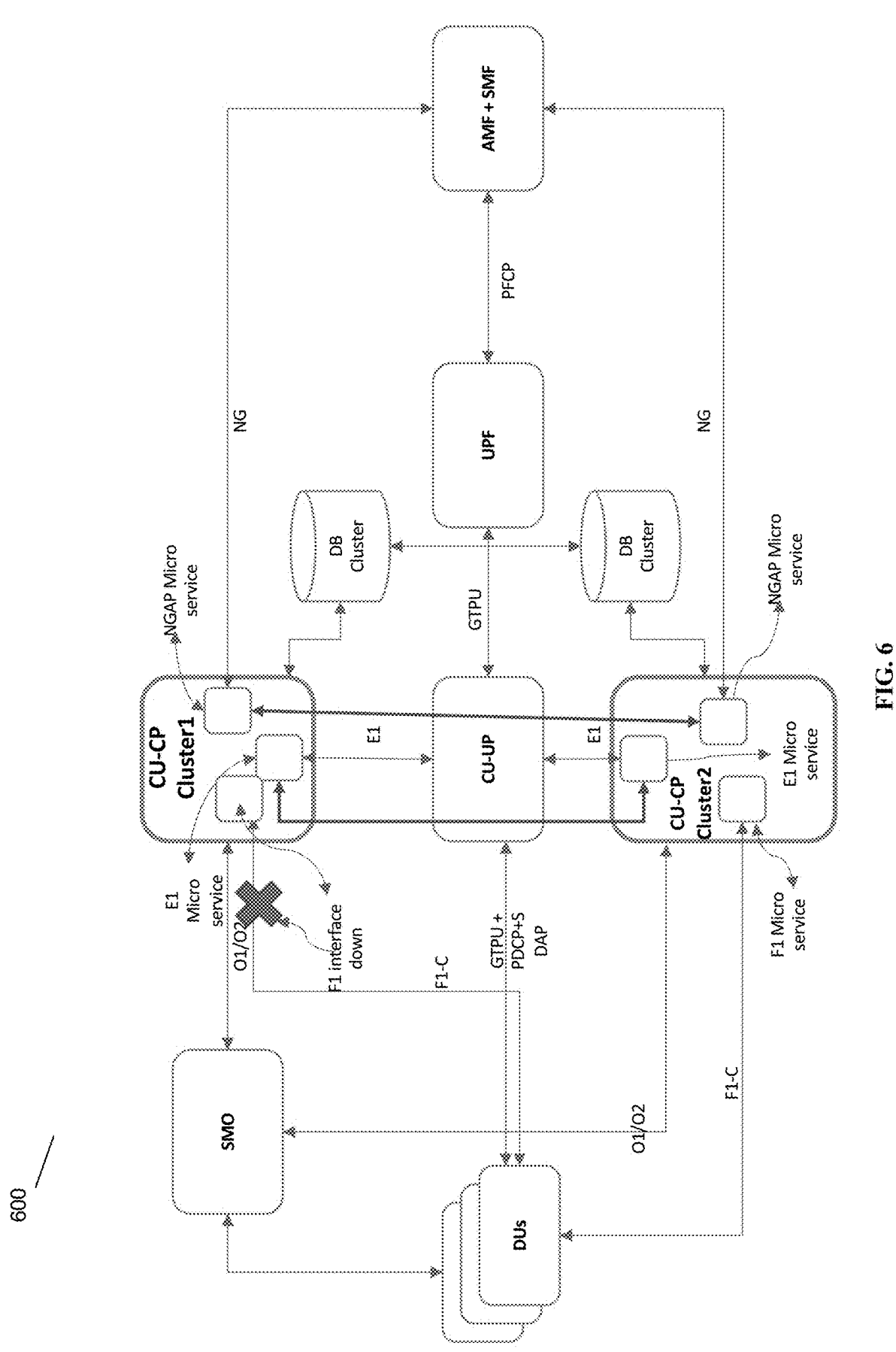
FIG. 6 shows a schematic diagram of a CU-CP high availability architecture in a second scenario, in accordance with some embodiments.

FIG. 6 shows a schematic diagram of a CU-CP high availability architecture in a second scenario, in accordance with some embodiments. For example, on cluster-1, F1 link to DU is down due to any reason, in that case there can be multiple approach to handle incoming traffic from remaining interfaces like E1/NG/Xn-App/X2 as peer nodes are not aware of F1 link status.

In some embodiments, in order to handle traffic until cluster-1 F1 interface is down, it is contemplated to temporarily Bring down the remaining interface like E1/NG/Xn-App/X2 and traffic will be shifted by all other peers to CU-CP cluster-2. Hence no impact on existing stable subscriber/sessions on CU-CP. Other cluster will have resources and information to handle traffic load.

Once F1 interface is down, Other micro-services will be informed of the internal state of the cluster and can start proxying the traffic to other cluster micro-services. E.g. NGAP/E1/Xn/X2 micro service will forward corresponding micro-service in other cluster. Available cluster will serve the new/existing subscriber/sessions.

Scenario 3: E1 Interface/Link Down on One CU-CP Cluster (FIG. 7)

Figure 7:
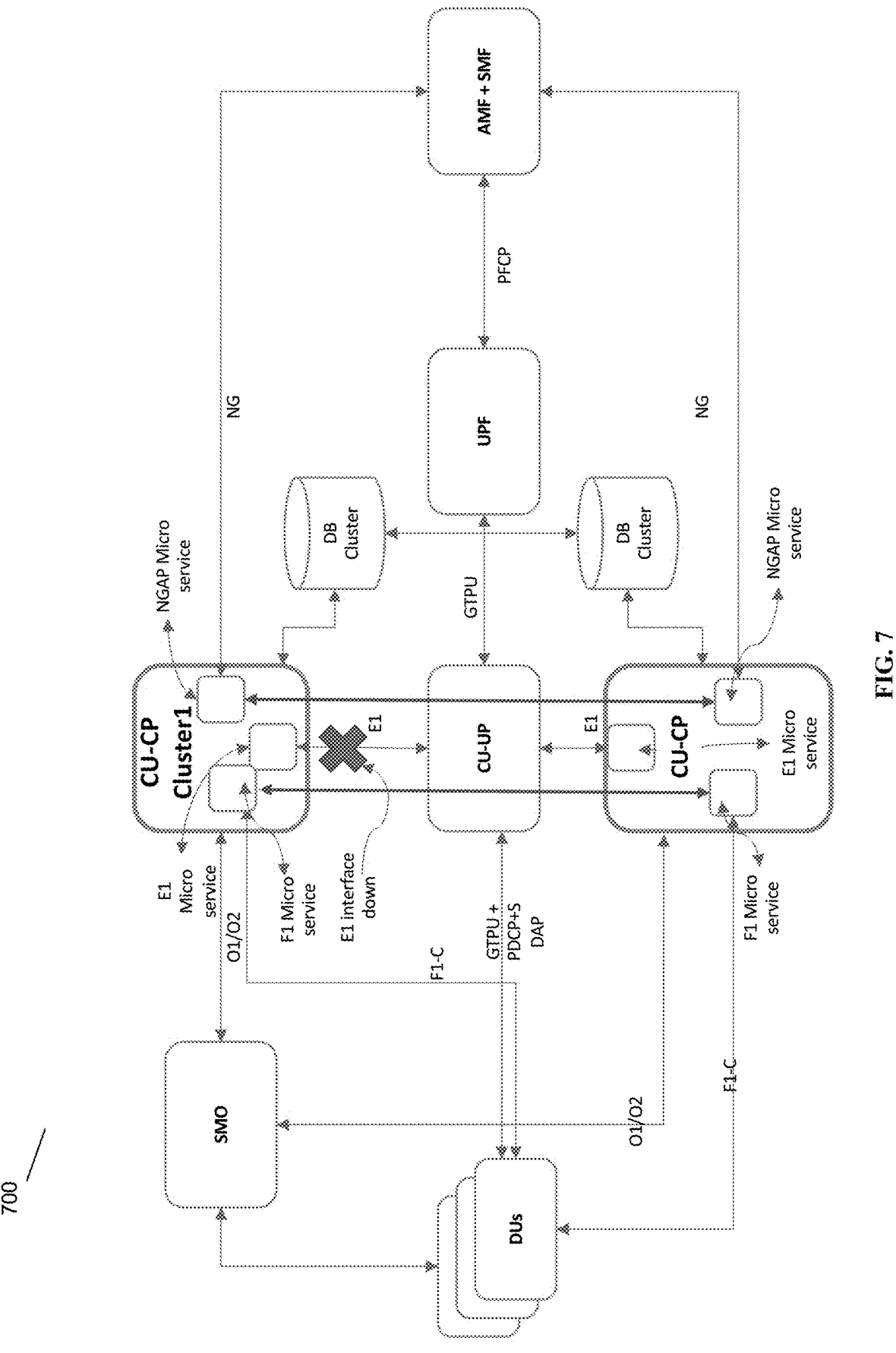
FIG. 7 shows a schematic diagram of a CU-CP high availability architecture in a third scenario, in accordance with some embodiments.

FIG. 7 shows a schematic diagram of a CU-CP high availability architecture in a third scenario, in accordance with some embodiments. For example, on cluster-1, E1 link to CU-UP is down due to any reason, in that case there can be multiple approach to handle incoming traffic from remaining interfaces like F1/NG/Xn-App/X2 as peer nodes are not aware of E1 link status.

In some embodiments, to handle traffic till cluster-1 E1 interface is down, it may be performed to temporarily bring down the remaining interface like F1/NG/Xn-App/X2 and traffic can be shifted by all other peers to CU-CP cluster-2. Hence no impact on existing stable subscriber/sessions on CU-CP. Other cluster will have resources and information to handle traffic load.

Once E1 interface is down, Other micro-service will be informed of the internal state of the cluster and can start proxying the traffic to other cluster micro-services. E.g. NGAP/F1/Xn/X2 micro service will forward corresponding micro-service in another cluster. Available cluster will serve the new/existing subscriber/sessions.

Scenario 4: NG Interface/Link Down on One of the CU-CP Cluster (FIG. 8)

Figure 8:
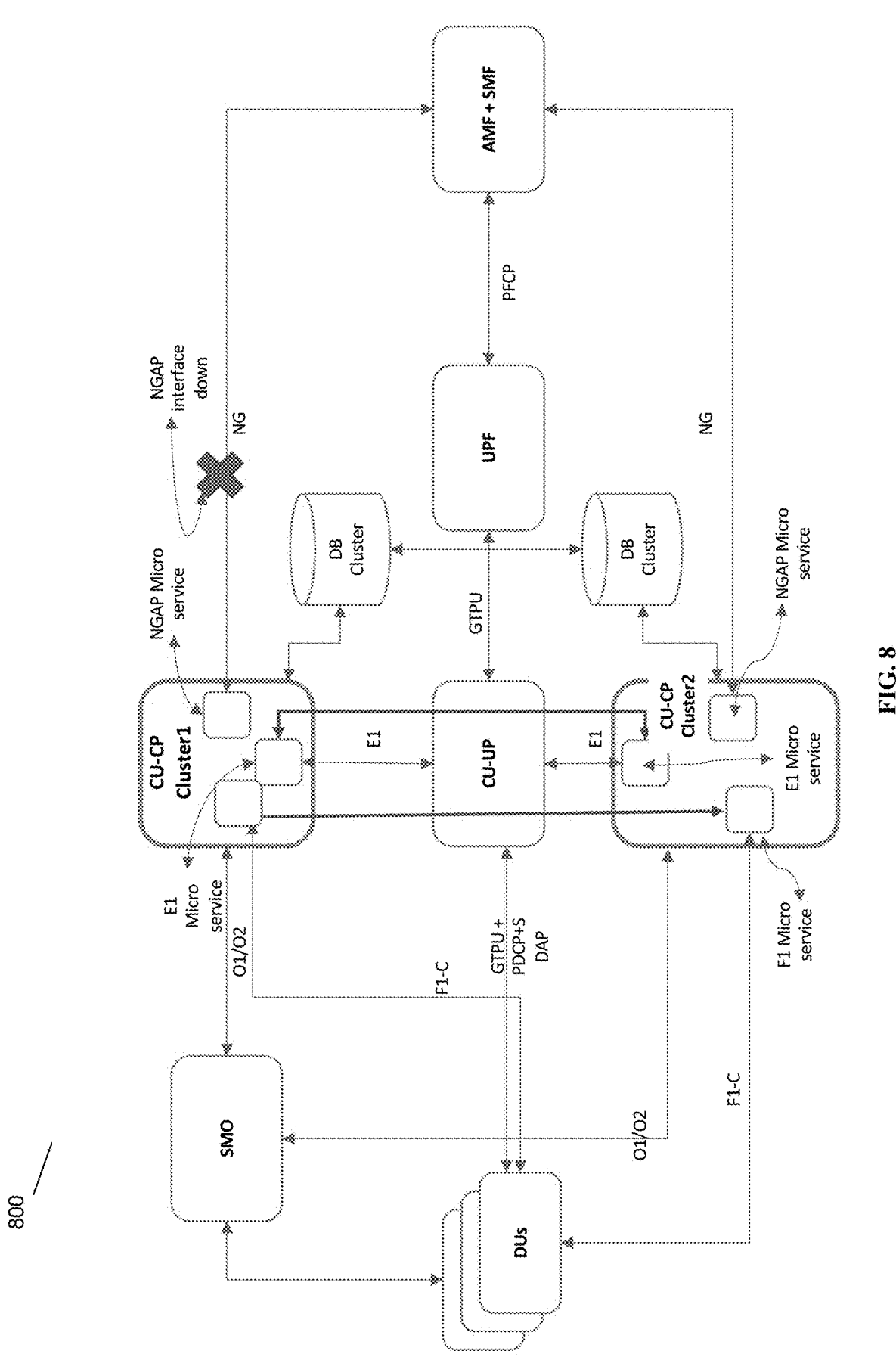
FIG. 8 shows a schematic diagram of a CU-CP high availability architecture in a fourth scenario, in accordance with some embodiments.

FIG. 8 shows a schematic diagram of a CU-CP high availability architecture in a fourth scenario, in accordance with some embodiments. For example, on cluster-1, NG link to AMF is down due to any reason, in that case there can be multiple approach to handle incoming traffic from remaining interfaces like F1/E1/Xn-App/X2 as peer nodes are not aware of NG link status.

Possible approach to handle traffic until cluster-1 NG interface is down.

Temporarily Bring down the remaining interface like F1/E1/Xn-App/X2 and traffic will be shifted by all other peers to CU-CP cluster-2. Hence no impact on existing stable subscriber/sessions on CU-CP. Other cluster will have resources and information to handle traffic load.

Once NG interface is down, Other micro-services will be informed of the internal state of cluster and can start proxying the traffic to other cluster micro-services. E.g. E1/F1/Xn/X2 micro service will forward corresponding micro-service in another cluster. Available cluster will serve the new/existing subscriber/sessions.

Scenario 5: Database Cluster is Down (not Shown)

This scenario will be handled by the database redundancy model, applications would have no impact on existing or new subscribers.

Figure 9:
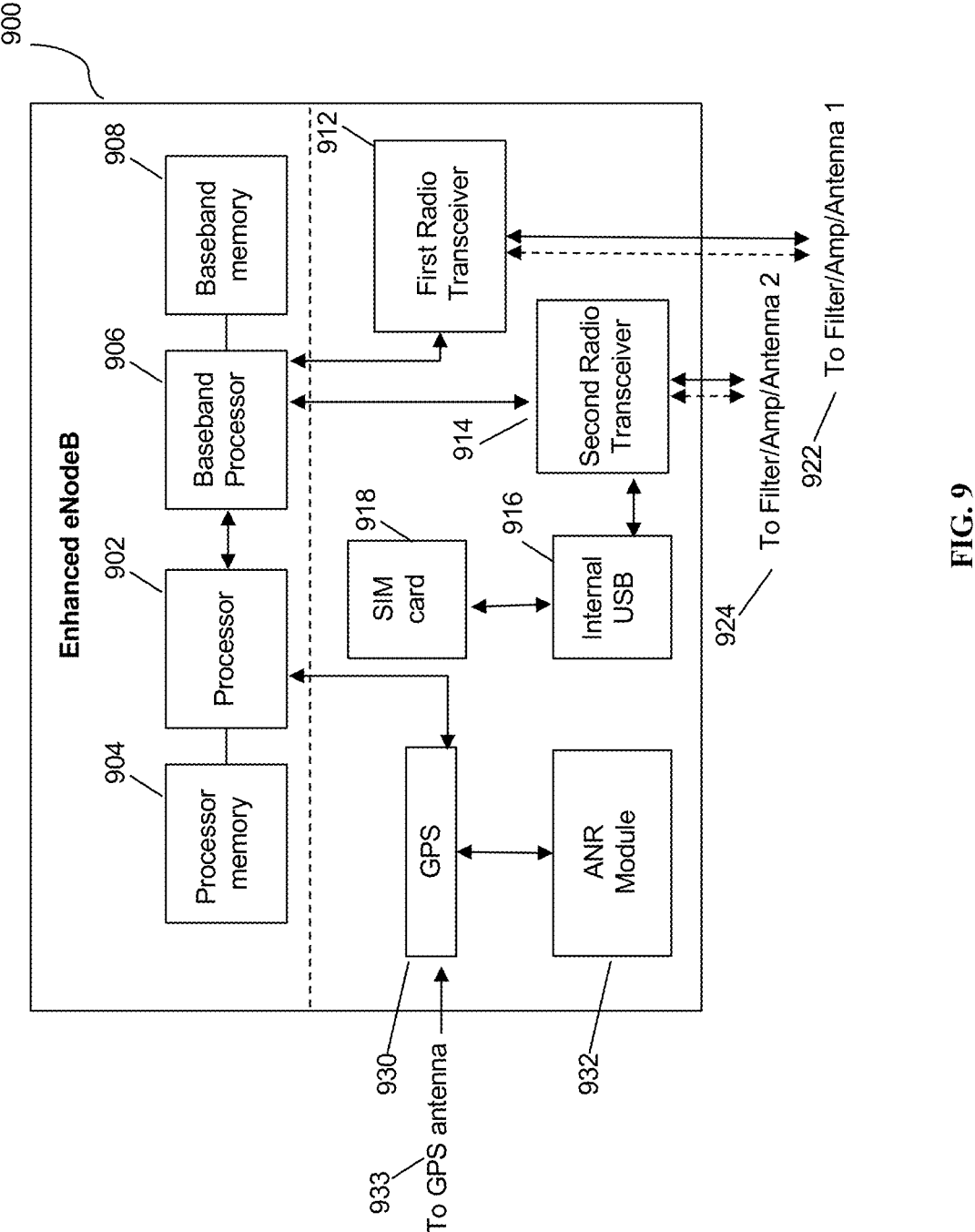
FIG. 9 shows an enhanced eNodeB for performing the methods described herein, in accordance with some embodiments.

FIG. 9 shows an enhanced eNodeB for performing the methods described herein, in accordance with some embodiments. eNodeB 900 may include processor 902, processor memory 904 in communication with the processor, baseband processor 906, and baseband processor memory 908 in communication with the baseband processor. Mesh network node 900 may also include first radio transceiver 912 and second radio transceiver 914, internal universal serial bus (USB) port 916, and subscriber information module card (SIM card) 918 coupled to USB port 916. In some embodiments, the second radio transceiver 914 itself may be coupled to USB port 916, and communications from the baseband processor may be passed through USB port 916. The second radio transceiver may be used for wirelessly backhauling eNodeB 900.

Processor 902 and baseband processor 906 are in communication with one another. Processor 902 may perform routing functions, and may determine if/when a switch in network configuration is needed. Baseband processor 906 may generate and receive radio signals for both radio transceivers 912 and 914, based on instructions from processor 902. In some embodiments, processors 902 and 906 may be on the same physical logic board. In other embodiments, they may be on separate logic boards.

Processor 902 may identify the appropriate network configuration, and may perform routing of packets from one network interface to another accordingly. Processor 902 may use memory 904, in particular to store a routing table to be used for routing packets. Baseband processor 906 may perform operations to generate the radio frequency signals for transmission or retransmission by both transceivers 910 and 912. Baseband processor 906 may also perform operations to decode signals received by transceivers 912 and 914. Baseband processor 906 may use memory 908 to perform these tasks.

The first radio transceiver 912 may be a radio transceiver capable of providing LTE eNodeB functionality, and may be capable of higher power and multi-channel OFDMA. The second radio transceiver 914 may be a radio transceiver capable of providing LTE UE functionality. Both transceivers 912 and 914 may be capable of receiving and transmitting on one or more LTE bands. In some embodiments, either or both of transceivers 912 and 914 may be capable of providing both LTE eNodeB and LTE UE functionality. Transceiver 912 may be coupled to processor 902 via a Peripheral Component Interconnect-Express (PCI-E) bus, and/or via a daughtercard. As transceiver 914 is for providing LTE UE functionality, in effect emulating a user equipment, it may be connected via the same or different PCI-E bus, or by a USB bus, and may also be coupled to SIM card 918. First transceiver 912 may be coupled to first radio frequency (RF) chain (filter, amplifier, antenna) 922, and second transceiver 914 may be coupled to second RF chain (filter, amplifier, antenna) 924.

SIM card 918 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 900 is not an ordinary UE but instead is a special UE for providing backhaul to device 900.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 912 and 914, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 902 for reconfiguration.

A GPS module 930 may also be included, and may be in communication with a GPS antenna 932 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 932 may also be present and may run on processor 902 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 10:
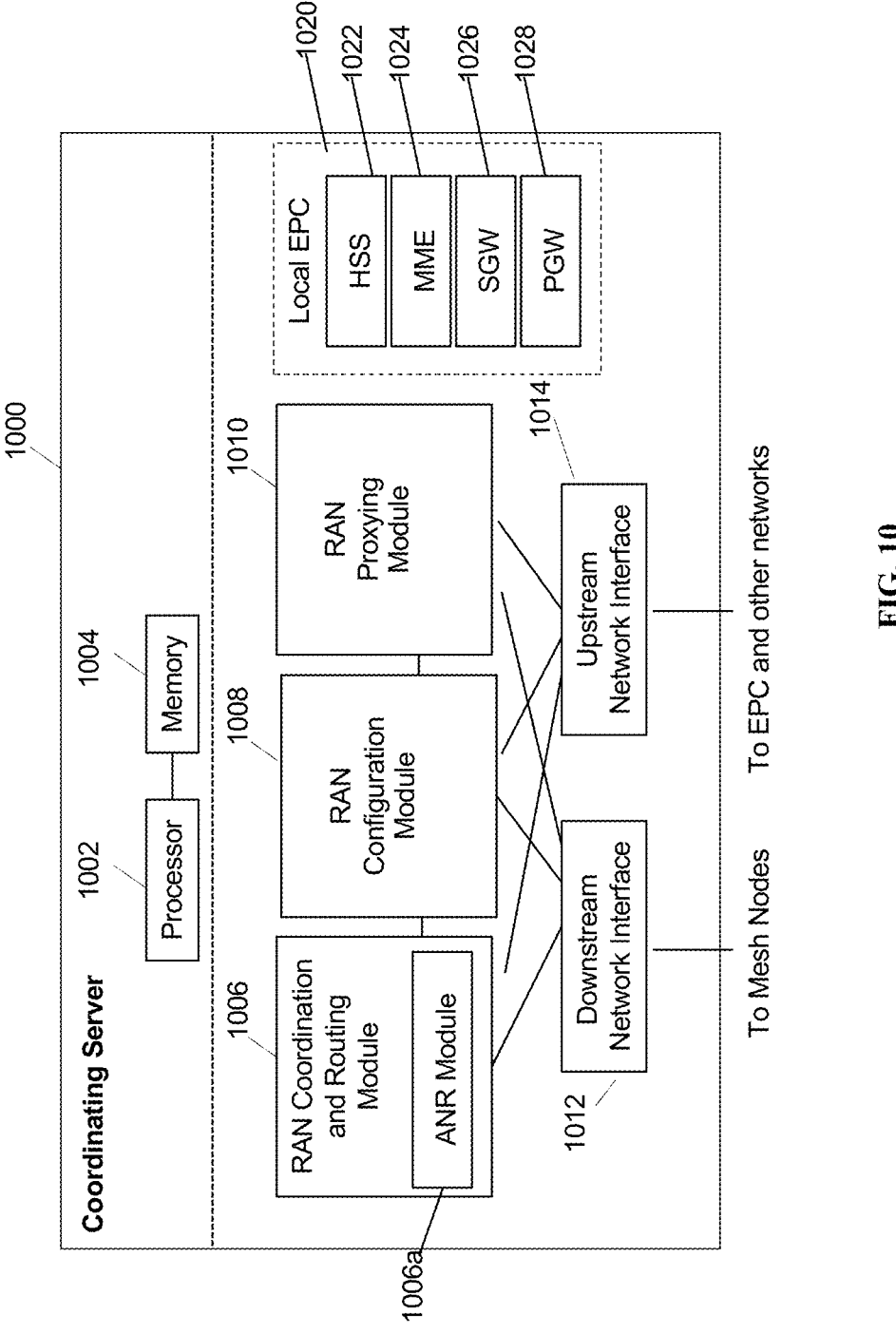
FIG. 10 shows a coordinating server for providing services and performing methods as described herein, in accordance with some embodiments.

FIG. 10 shows a coordinating server for providing services and performing methods as described herein, in accordance with some embodiments. Coordinating server 1000 includes processor 1002 and memory 1004, which are configured to provide the functions described herein. Also present are radio access network coordination/routing (RAN Coordination and routing) module 1006, including ANR module 1006a, RAN configuration module 1008, and RAN proxying module 1010. The ANR module 1006a may perform the ANR tracking, PCI disambiguation, ECGI requesting, and GPS coalescing and tracking as described herein, in coordination with RAN coordination module 1006 (e.g., for requesting ECGIs, etc.). In some embodiments, coordinating server 1000 may coordinate multiple RANs using coordination module 1006. In some embodiments, coordination server may also provide proxying, routing virtualization and RAN virtualization, via modules 1010 and 1008. In some embodiments, a downstream network interface 1012 is provided for interfacing with the RANs, which may be a radio interface (e.g., LTE), and an upstream network interface 1014 is provided for interfacing with the core network, which may be either a radio interface (e.g., LTE) or a wired interface (e.g., Ethernet).

Coordinator 1000 includes local evolved packet core (EPC) module 1020, for authenticating users, storing and caching priority profile information, and performing other EPC-dependent functions when no backhaul link is available. Local EPC 1020 may include local HSS 1022, local MME 1024, local SGW 1026, and local PGW 1028, as well as other modules. Local EPC 1020 may incorporate these modules as software modules, processes, or containers. Local EPC 1020 may alternatively incorporate these modules as a small number of monolithic software processes. Modules 1006, 1008, 1010 and local EPC 1020 may each run on processor 1002 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality. Various components as described herein may be containerized, virtualized, proxied, simulated, or otherwise abstracted. In some embodiments, other network nodes, interfaces, protocols, and communications in relation to a CU-CP as known in the art may also be configured to take advantage of the high availability features and architectures described herein.

Any cluster may include a plurality of hardware or virtualized nodes, in some embodiments. Any cluster, microservice, container etc. may be placed behind a caching server, equipped with a hot-swappable or warm-swappable failover (server/microservice/container/etc.), synced with another backup, or otherwise configured for high availability. In some embodiments, state for one or more of the servers/microservices/containers, etc. described herein may be stored at the database or database cluster, and this state may be used to bring up servers/microservices/containers that have failed.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method of providing centralized unit control plane (CU-CP) high availability, comprising:
configuring a single CU-CP instance across a first node and a second node, wherein the single CU-CP instance appears as a single node having multiple IP addresses to all its peer nodes;
keeping session information of the single CU-CP instance at the first node and at the second node; and
wherein if the first node fails, the second node is configured to take up calls from the first node.

2. The method of claim 1, further comprising configuring the single CU-CP instance using core microservices and protocol-specific microservices.

3. The method of claim 1, further comprising maintaining subscriber data for a plurality of subscribers in a database, wherein the plurality of subscribers includes at least one subscriber supported at the first node and at least one other subscriber supported at the second node.

4. The method of claim 1, further comprising configuring the single CU-CP instance across a cluster of virtualized machines providing redundancy and failover.

5. The method of claim 1, wherein upon failure of the first node, microservices at the second node are informed of the failure of the first node.

6. The method of claim 1, wherein upon failure of a microservice at the first node, other microservices at the first node are informed of the failure of the microservice at the first node.

* * * * *